LINE PRINTER BUFFER

Filed June 4, 1962

4 Sheets-Sheet 1

INVENTORS
HARLAN E. ANDERSON
KENNETH H. OLSEN
BENJAMIN M. GURLEY
RICHARD L. BEST

BY Blair & Buckles
ATTORNEYS

LINE PRINTER BUFFER

Filed June 4, 1962

INVENTORS
HARLAN E. ANDERSON
KENNETH H. OLSEN
BENJAMIN M. GURLEY
RICHARD L. BEST

BY Blair & Buckles

ATTORNEYS

LINE PRINTER BUFFER

Filed June 4, 1962

INVENTORS
HARLAN E. ANDERSON
KENNETH H. OLSEN
BENJAMIN M. GURLEY
RICHARD L. BEST
BY
Blair & Buckles
ATTORNEYS

LINE PRINTER BUFFER

Filed June 4, 1962 4 Sheets-Sheet 4

INVENTORS
HARLAN E. ANDERSON
KENNETH H. OLSEN
BENJAMIN M. GURLEY
RICHARD L. BEST
BY
Blair & Buckles
ATTORNEYS United States Patent Office 3,242,469
Patented Mar. 22, 1966

3,242,469

LINE PRINTER BUFFER

Harlan E. Anderson, Concord, Kenneth H. Olsen, Bedford, Benjamin M. Gurley, West Concord, and Richard L. Best, Wayland, Mass., assignors to Digital Equipment Corporation, Maynard, Mass.

Filed June 4, 1962, Ser. No. 199,837
19 Claims. (Cl. 340—172.5)

This invention relates to an improved line printer buffer for use between a source delivering digital information and a printer that records the information at a rate different from that at which it is delivered. The buffer utilizes complementable storage elements, such as flip-flops, to store the digital information at the rate at which it is made available by the source. It then delivers the information for printing at the slower operating rate of the printer.

Electronic digital data processing systems generally deliver output information at a rapid rate, whereas printers which record the information operate at a substantially slower rate. It is time-wise inefficient to constrain the computer to operate at the slow printing rate in order to print information directly from the computer. Accordingly, printer buffers are employed to accept the digital information at the rapid computer rate and store it for delivery to the printer.

Line printers, with which the present invention is particularly useful, have a plurality of print wheels, with type characters embossed thereon, mounted to rotate together on a common shaft. To print the characters, solenoid-driven hammers drive the paper against the selected characters on the print wheels. Each wheel prints in one column, and the paper is advanced after each line is printed, i.e., after each full rotation of the print wheels.

A line printer buffer commonly used prior to this invention incorporates a matrix of magnetic cores having in each column thereof a core for each character embossed on the print wheel associated with the column. Information is stored in the matrix by changing the state of selected cores with cross-bar switching techniques. As each print-wheel character approaches a hammer, the core corresponding to the character is interrogated. If the character is to be printed, interrogation reverses the state of the core, thereby generating a pulse in a sense winding. The pulse actuates the hammer solenoid in the printer and thus prints the character.

These prior buffers require a large number of cores, i.e., the number of columns times the number of characters in each column. In addition, they require complex equipment to read the characters into and out of the matrices.

Accordingly, it is a principal object of the present invention to provide an improved line printer buffer for use between a source of digital information and a line printer.

A further object of the invention is to provide a line printer buffer that is readily constructed with plug-in circuit modules. Correspondingly, an object of the invention is to provide a buffer in which problems of interconnecting circuit elements are minimized.

Still another object of the invention is to provide a line printer buffer having high reliability and accuracy, together with high speed operation.

Other objects of the invention will in part be obvious and will in part appear hereinafter.

The invention accordingly comprises the features of construction, combination of elements and arrangement of parts which will be exemplified in the constructions hereinafter set forth and the scope of the invention will be indicated in the claims.

For a fuller understanding of the nature and objects of the invention, reference should be had to the following detailed description taken in connection with the accompanying drawings, in which.

In general, the present line printer buffer comprises a plurality of bistable memory elements, such as flip-flops, having complement inputs. A signal applied to such an input changes the state of the memory element regardless of its prior state. The elements are schematically arranged in rows and in columns, and each column is associated with a print wheel of the line printer.

Binary coded information is fed into the buffer a column at a time by means of a unique logical arrangement. First, when a ONE, for example, is to be stored in selected flip-flops in the selected column, the rows of flip-flops including the selected ones are complemented, i.e., all the flip-flops in those rows are reversed. Next, the flip-flops in the selected column are cleared, i.e., switched to the ZERO state. After the same rows are again complemented, the information is stored in the selected column, while the flip-flops in the remaining columns are in their original state. This cycle is repeated to store information in each of the other columns of memory elements. Essentially, in each column, the stored information represents the position on the corresponding print wheel where the desired character is embossed. Thus, the stored information represents the print wheel position required to print the desired character with the hammer.

After the buffer is thus loaded, the stored character positions are repetitively compared with position of the print wheels. Correspondence between stored positions and actual positions is sensed with AND circuits connected in each column of flip-flops. The AND circuits then actuate the hammer solenoids at the proper times for printing the stored characters.

Figure 1:
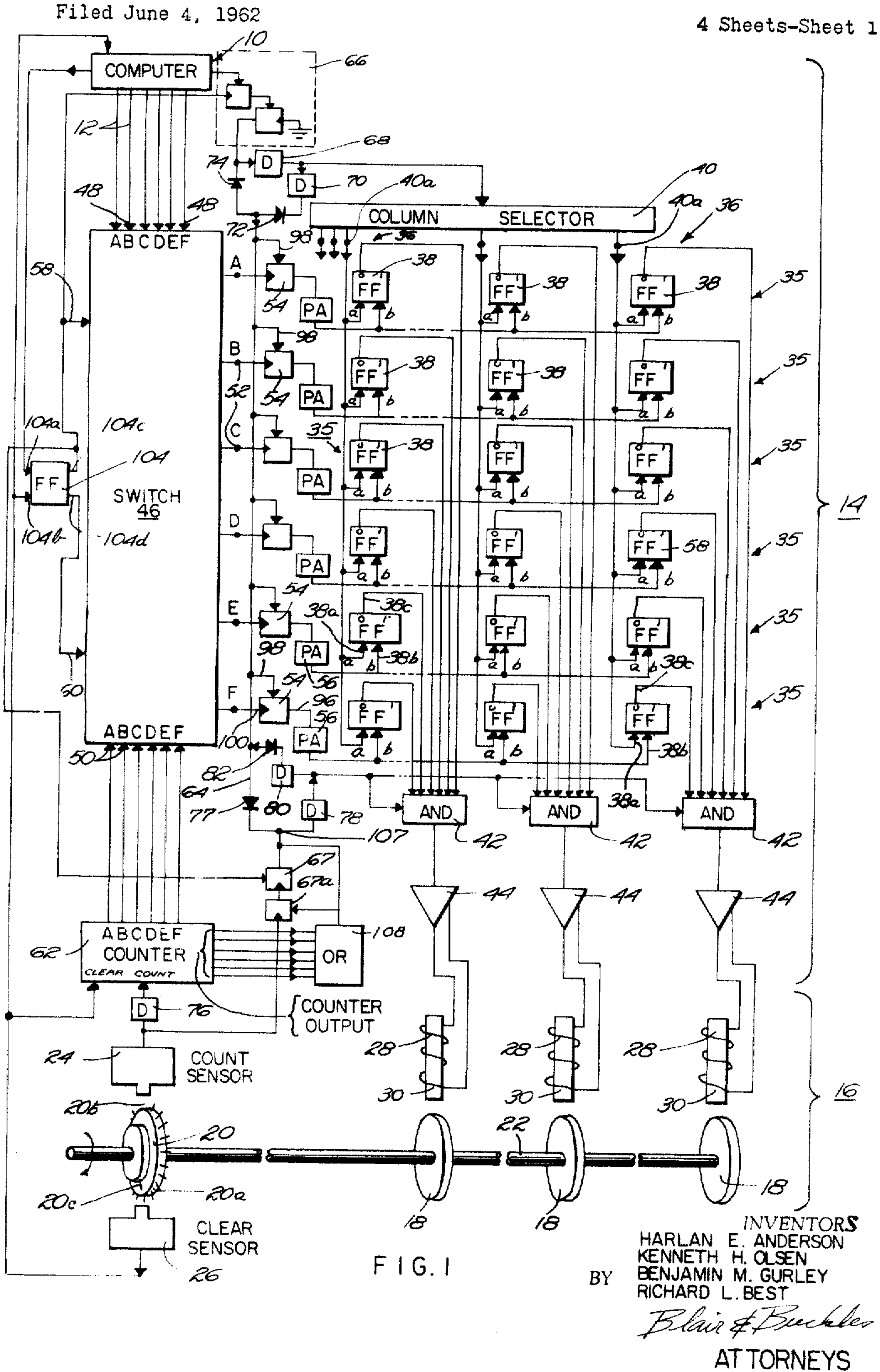
FIG. 1 is a schematic representation, in block form, of a line printer buffer embodying the present invention.

More specifically, in the circuit of FIG. 1, a digital computer 10 delivers binary-coded information on signal lines 12 to a line printer buffer generally indicated at 14. The buffer 14 stores the information and delivers it to a line printer, a fragment of which is indicated at 16.

The line printer 16 has a plurality of print wheels 18, with characters available for printing (not shown) embossed on their rims. A timing wheel 20, with a first group of spokes **20*a* protruding from its rim, is mounted to rotate together with the print wheels 18 on a common shaft 22. The print wheels are aligned with each other, i.e., with like characters in the same angular position, and each of the spokes 20*a* corresponds to a selected print-wheel character. The spokes 20*a* and the characters may be arranged with a blank space on the rim of each wheel, as indicated by the gap 20*b* on the timing wheel. The timing wheel 20 has a further spoke 20*c* axially spaced from the spokes 20*a* and having a fixed angular position with respect to the gap 20*b***.

A count sensor 24, mounted adjacent the timing wheel 20, develops a pulse as each spoke **20*a* passes it, and a clear sensor 26 is similarly mounted to develop a pulse with each passing of the spoke 20***c*. The sensors 24 and 26 may be of any well-known design incorporating, for example, magnetic proximity detectors when the spokes are of magnetic material.

The printer 16 is also provided with hammer solenoids 28 that drive hammers 30 to engage paper (not shown) against the print wheels 18. Each solenoid 28, its hammer 30, and the associated print wheel 18 print the characters in a single column along the paper.

Still referring to FIG. 1, the buffer 14 has flip-flops 38 schematically arranged in rows 35 and columns 36, each column being associated with a single print wheel 18. Each row 35 corresponds to a position or place in the logical sequences of digits that represent the characters being stored. Connections are made to each flip-flop 38 at a ZERO, or clear, input terminal 38*a*, a complement input terminal 38*b*, and a ZERO output terminal 38*c*. The complement terminals 38*b* of the flip-flops in each row thereof are connected together and, as described below, are connected to pulse sources.

A column selector 40, preferably an electronic distributor or stepping switch, has output terminals 40*a* each of which is connected to the ZERO input terminals 38*a* of all the flip-flops in one column. The ZERO output terminals 38*c* of the flip-flops of each column 36 are connected to an AND circuit 42, whose output is augmented by an amplifier 44 to activate the hammer solenoid 28 of the corresponding print wheel 18.

Binary information is read into the buffer during a load cycle by loading one column 36 at a time. For example, a six-bit binary character is stored in the first column, i.e., the rightmost column in FIG. 1, by delivering a pulse to the complement inputs 38*b* of each row 35 that contains a first column flip-flop 38 in which a ONE is to be stored. Each flip-flop in the ONE state receiving a complement pulse changes to the ZERO state and each element in the ZERO state changes to the ONE state. The column selector 40 then clears the first column 36, i.e., imposes the ZERO state on the flip-flops therein, by delivering a pulse to the ZERO input terminals 38*a* of its flip-flops. Complement pulses are then applied to the same rows 35 that were complemented before. The binary information is now stored in the flip-flops of the first column, whereas the flip-flops in the other columns of the buffer, having been either unchanged or changed twice, are in the same state as they were before loading of the first column. The loading sequence then proceeds to the next column and the next after that, until all the columns have been loaded.

During the print cycle, the system generates a coded representation of each print-wheel character approaching the hammers 30 of the printer and it delivers the representation in parallel to all the columns of flip-flops. The flip-flops in the rows to which a binary ONE is applied in this process are complemented. When the coded representation corresponds to the information stored in a column, all of that column's flip-flops are in the ZERO state after the rows are thus complemented. The AND circuit 42 associated with the column is thereby conditioned to pass a timing pulse, which actuates the corresponding hammer 30 to print the desired character.

Next, the same rows 35 are again complemented, thereby returning the flip-flops 38 therein to their previous states. This process continues until all of the characters on the wheels 18 pass by the hammers 30, by which time each of the columns has has all its flip-flops in the ZERO state together just once.

Still referring to FIG. 1, a switch generally indicated at 46 has a set of input terminals 48 to which the computer 10 delivers digital information, a second set of input terminals 50 which receive information from the line printer 16, and a set of output terminals 52. Each output terminal 52 is connected through a gate 54 and a pulse amplifier 56 to the complement input terminals 38*b* of the flip-flops in one of the rows 35. The switch 46 is also provided with terminals 58 and 60 to which control signals are delivered, as described below, to connect either the terminals 48 or the terminals 50 to the output terminals 52.

A counter 62 of conventional design counts the pulses developed by the count sensor 24 and delivers the count in parallel to the input terminals 50 of the switch 46. Assuming that the counter 62 always begins counting at the same point during rotation of the wheels 18, each number in the counter corresponds to the passage of a selected character by the hammers 30. Thus, the count serves as a code corresponding to the various characters on the print wheels.

A bus 64 carries pulses from the computer 10 and the count sensor 24 to the gates 54. Negative-going pulses on the bus 64 from the computer 10 are also passed to the column selector 40 through a delay unit 68. From the delay unit 68 they are also returned to the pulse line through a second delay unit 70 and an isolating diode 72. The diode 72 and a second isolating diode 74 prevents pulses from the sensor 24 from reaching the column selector 40. The diode 74 also prevents circulation of pulses around the loop containing the delay units 68 and 70.

Count pulses from the sensor 24 are applied to the count input of the counter 62 after being delayed in a delay unit 76. They are also passed to the bus 64 by way of an isolating diode 77. A second path to the bus 64 leads through delay units 78 and 80 and an isolating diode 82. From the delay unit 78 the count pulses are transmitted to the AND circuits 42. The diodes 77 and 82 are similar in purpose to the diodes 72 and 74.

Figure 2A:
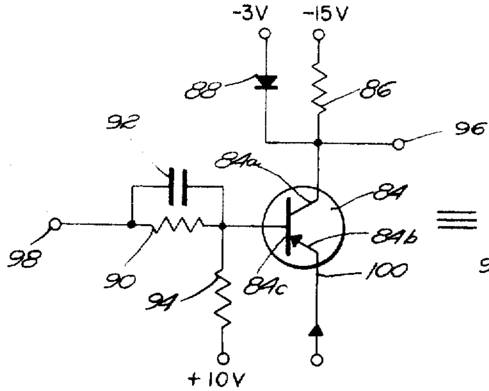
FIG. 2*a* is a schematic representation of the inverters used in FIGS. 1 and 3.

Referring now to FIG. 2*a*, each of the gates 54 of FIG. 1 may comprise a p-n-p transistor 84 having a collector 84*a*, an emitter 84*b* and a base 84*c*. The collector 84*a*, which is connected through a load resistor 86 to a negative potential, e.g., −15 volts, is clamped to −3 volts by a diode 88. The gate circuit of FIG. 2*a* is shown symbolically in FIG. 2*b*.

When the signal at the input terminal 98 is negative, the output terminal 96 is shorted to an emitter terminal 100. When the input signal is positive, or at ground level, the transistor is open-circuited, and the output signal at terminal 98 is at −3 volts. When the terminal 100 is at −3 volts, the output at terminal 96 remains at −3 volts regardless of the input signal at terminal 98.

Figure 3:
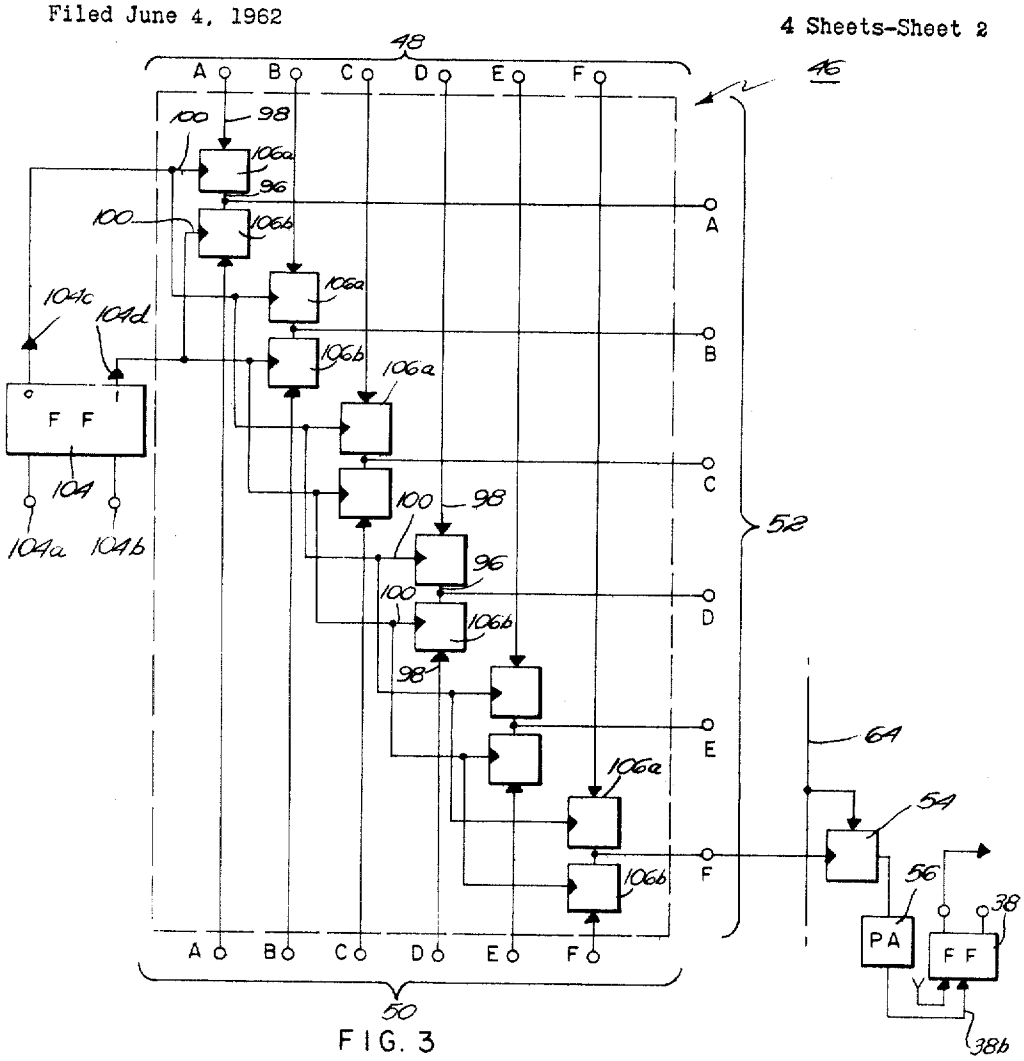
FIG. 3 is a schematic representation of a portion of the buffer of FIG. 1.

Referring to FIG. 3, the switch 46 comprises a pair of gates 106*a* and 106*b* for each output terminal 52. The gates 106*a* transfer signals from the input terminals 48 to the output terminals 52, and the gates 106*b* perform a similar function between the input terminals 50 and the terminals 52. As described below, the gates 106*a* and 106*b* are interconnected so that when the input terminals 48 are coupled to the terminals 52, the terminals 50 are isolated from them and vice versa.

Figure 2B:
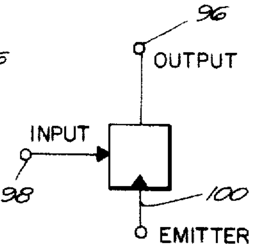
FIG. 2*b* is a simplified symbolic representation of the inverter shown in FIGURE 2*a*.

The gates 106*a* and 106*b* are preferably similar to the gates 54 of FIGS. 2*a* and 2*b*. Each input terminal 48 of the switch 46 is connected to the control terminal 98 of a gate 106*a*, and each input terminal 50 is similarly connected to a gate 106*b*. The output terminals 96 from each pair of gates in the switch are connected to each other and also to an output terminal 52. The emitter terminals 100 of the gates 106*a* are connected to the ZERO output terminal 104*c* of a flip-flop 104, and the terminals 100 of the gates 106*b* are connected to the ONE output terminal 104*d* of the flip-flop. It will be apparent that each pair of gates whose terminals 96 are connected together require but one resistor 86 and diode 88 (FIG. 2*a*) between them.

To connect the input terminals 48 to the output terminals 52 a pulse is applied to the ZERO input terminal 104*a* of the flip-flop 104, whereby the ZERO output terminal 104*c* is substantially at ground potential and the ONE terminal 104*d* is at −3 volts. This essentially isolates the output terminals 96 of the gates 106*b* from their emitter terminals 98, because even if they conduct, they cannot provide zero volt outputs. The gates 106*a*, on the other hand, when they conduct, connect their output terminals 96 to emitter ground. Thus, the digital signals applied to the input terminals 48 appear at the output terminals 52 inverted. A ONE input at 48 is a −3 volt level, creating a ground output at the corresponding terminal 52.

To reverse the switch 46, i.e., couple the input terminals 50 to the output terminals 52 and isolate the terminals 48 from the terminals 52, a pulse is delivered to the input 104*b* of the flip-flop 104, thereby reversing the state of the flip-flop.

Referring again to FIG. 1, to consider the loading of information into the buffer 14, assume that the terminal 104*a* of flip-flop 104 has been energized to couple the input terminals 48 of the switch 46 to the corresponding output terminals 52. Next, the computer delivers to the terminals 48 voltage levels corresponding to the information to be stored in the first column of flip-flops 38, and then it transmits a pulse, via the bus 64 to the input terminals 98 of the gates 54.

Since the output terminals of the gates 54 are clamped to −3 volts (FIG. 2*a*) prior to receipt of this pulse, there is no change in the output voltages of the gates connected to the output terminal 52 that are at −3 volts (the ZERO level). However, the gates 54 that are connected to output terminals 52 at ground potential (inverted from the ONE level at the terminals 48) deliver pulses to the pulse amplifiers 56, which in turn deliver negative pulses to the complement input terminals 38*b* of the flip-flops 38 connected thereto. In this manner, the state of all the flip-flops 38 is reversed in each row 35 for which the computer delivers a binary ONE.

Next, the pulse on the bus 64 that operated the gates 54 is passed by the delay unit 68 to actuate the column selector 40 after complementing has taken place; and the column selector then delivers a clear signal to each flip-flop in the first column 36. The pulse then passes through the delay unit 70 and diode 72 back to the pulse line 64, and is delivered to the input terminals 98 of the gates 54. The gates are thereby again actuated to complement the same rows of flip-flops as before, with the result that the flip-flops in all the columns except the first one are returned to their original state. The flip-flops of the first column store the digital signal delivered from the computer 10 to the switch 46.

This cycle, comprising the steps of (1) delivering to the terminals 48 the binary signals for one column, (2) complementing of flip-flops, (3) clearing the selected column, and (4) recomplementing the flip-flops previously complemented, is repeated until the computer has stored information in each column. In each cycle, the column selector 40 clears the next successive column. This may be done by using stepping-switch techniques in the selector, or the latter may be a decoder instructed by the computer to clear a selected column each time.

When the computer 10 has finished loading the buffer 14 it energizes the input 104*b* of the flip-flop 104 to connect the counter 62 to the output terminals 52 of the switch 46 and initiate the printing cycle.

The total time required to load information into a 120 column buffer from a computer operating at a 2 megacycle rate is one and one-half microseconds for each column, or a total time of 180 microseconds. This may be compared to the time required to print the stored information, i.e., the time required for the print wheels to complete one revolution, which is 0.02 secsecond, when the shaft 22 rotates at 3000 r.p.m. Thus, the printing time is more than 100 times as long as the time required to load the buffer. Accordingly, by interposing the present buffer between the computer and the printer, some portions of the computer are free to operate approximately 100 times faster than if tied directly to the printer.

During the load cycle, the paper in the printer is advanced one line. This operation requires considerably more time than does buffer loading, and, accordingly, the loading and paper-advancing operations preferably are performed during the same interval, while the gap 20*b* on the timing wheel passes the counter sensor 24. Accordingly, the clear sensor 26, which emits a pulse once during each revolution of the timing wheel 20, is connected to flip-flop terminal 104*a* to connect the computer through to the output terminals 52 of the switch 46 when the gap 20*b* begins to pass the sensor 24.

The timing signals which control the buffer during the print cycle are derived from the count sensor 24, and accordingly, are synchronized with the rotation of the timing wheel 20 and print wheel 18. The counter 62 counts the pulses delivered from the sensor 24, starting over again for each revolution of the print wheel 20, and it is programmed to deliver to the switch 46 a binary-coded representation of the print wheel characters passing the hammers 30. In this embodiment of our invention described herein, the count registered in counter 62 identifies the print wheel character that is one character behind the character in the print position. This relation results from the timing sequence of the print cycle, whereby the count pulses are delayed by the unit 76 prior to delivery to the counter 62. Since each count pulse is delayed in unit 76 before being counted, each binary signal coupled from the counter 62 to the switch output terminals 52 is applied to the flip-flops 38 by the succeeding pulse developed by sensor 24. In other words, by delaying the counter with unit 74, the pulse developed by the *n*th probe 20*a* applies to the flip-flops 38 the count signal representing the $(n-1)$th probe.

The count pulses delivered to the pulse line 64 are applied to the input terminals 98 of the gates 54 and they complement the flip-flops in the manner described above for the load cycle, depending on the presence of binary ZEROS or ONES at the output terminals of the counter 62. The count pulses are delayed in unit 78 to gate the AND circuits after the flip-flops are thus complemented. As described above, the AND circuits actuate the hammer solenoids to print the desired character when all the flip-flops in a column are in the ZERO state after being complemented with the signals from counter 62. The count pulses then return to the bus 64, through delay unit 80, to again complement the flip-flops 38. This returns the flip-flops to the same state they were in prior to the first complement step of the print cycle. These three steps, viz., (1) complementing the flip-flops 38, (2) gating the AND circuits 42 and (3) recomplementing the complemented flip-flops, are completed between passage of adjacent probes 20*a* past the sensor 24 and are repeated, in each printing sequence, for each character on the print wheels.

More specifically, each time the count in the counter 62 advances, the number represented by voltages at the terminals 52 (A–F) may correspond to the number stored in one or more of the columns or registers 36 of flip-flops 38. When this occurs, each flop-flop registering a ONE in such columns—and no other flip-flops therein—will be complemented by a pulse passed by a gate 54. After complementing, all the flip-flops in these columns register ZEROS, and the AND circuits 42 connected thereto pass the next print pulse for printing of the corresponding character. In all the other columns there will still be at least one ONE and no printing will take place. When the flip-flops 38 are recomplemented, the columns 36 are returned to their original state to await comparison with the next number registered by the counter 62.

The clear sensor 26 is connected to computer 10 to synchronize the load and print cycles in conjunction with its operation of the switch 46. In addition, the clear sensor delivers its pulses to the clear input of the counter 62, which starts a new count each time it is thus pulsed. The computer 10 may control the mechanism (not shown) which advances the printing paper between print sequences. The gates 66 and 67, which are controlled by the flip-flop 104, prevent pulses from being delivered to the bus 64 simultaneously by the computer and by the count sensor 24. Thus, gate 66 transmits pulses from the computer 10 to the bus 64 only during the load cycle, during which time the gate 67 effectively isolates the bus from the count sensor by grounding the junction 107 of the output terminals of these two elements. During the printing sequence, the gate 66 isolates the computer from the bus 64, while the gate 67, which is non-conducting, permits the count sensor to control the voltage at the junction 107. The gate 66 actually comprises a cascaded pair of gates of the type shown in FIG. 2 in order to provide the proper polarities at its output.

To save time, the timing wheel 20 and sensors 24 and 26 may be arranged to deliver the first count pulses to delay unit 76 before the load cycle is completed. This does not interfere with the load cycle, because gate 67 is isolating the bus 64 from the sensor 24 at this time. It does not interfere with printing, because the second count pulse is the one which initiates comparison of the flip-flop 38 columns with the contents of the counter 62.

To leave a blank space in a column, i.e., where nothing is printed, the computer stores a binary signal in the buffer in the same manner as if a character were to be printed in the space. However, to prevent the hammer solenoid from engaging the paper against the print wheel where the blank space is to be "printed," an OR circuit 108 is provided in the buffer 14. The OR circuit 108, whose output terminal is connected to the junction 107, interrupts the transmission of pulses from the sensor 24 to the bus 64 and AND circuits whenever the print-wheel character approaching the print position is the blank space.

The input signals to the OR circuit 108 are the complements of the signals from the counter 62 corresponding to the blank space. For example, if the code representation of a blank space is 101010, the circuit 108 is connected to receive the assertion level (−3 volts) at one of its inputs whenever there is a ZERO at counter output A or a ONE at output B or a ZERO at output C, and so on. Thus, as long as the count differs from 101010, the OR circuit output voltage is at −3 unless, of course, the output of the gate 67 or sensor 24 is at 0, i.e., grounded. When the counter 62 registers the blank space code, all the inputs to the OR circuit 108 are at zero volts. The output of the OR circuit, which includes a clamping arrangement similar to the one at the output of the gate circuit of FIG. 2, is also at this level. This grounds the junction 107 inhibiting the transmission of negative pulses from the sensor 24.

When the computer has a larger number of output wires, such as eighteen, instead of six as shown, six wires can be connected to each of three buffers identical to the buffer described herein. The computer information is loaded into the buffers in the manner described above, and then delivered simultaneously from all the buffers to the printer. Since the load cycle is substantially shorter than the print cycle, the over-all time required by the buffer unit to transfer information from the eighteen-bit computer to the printer is substantially the same as the time required to print the output from a six digit computer.

Figure 4:
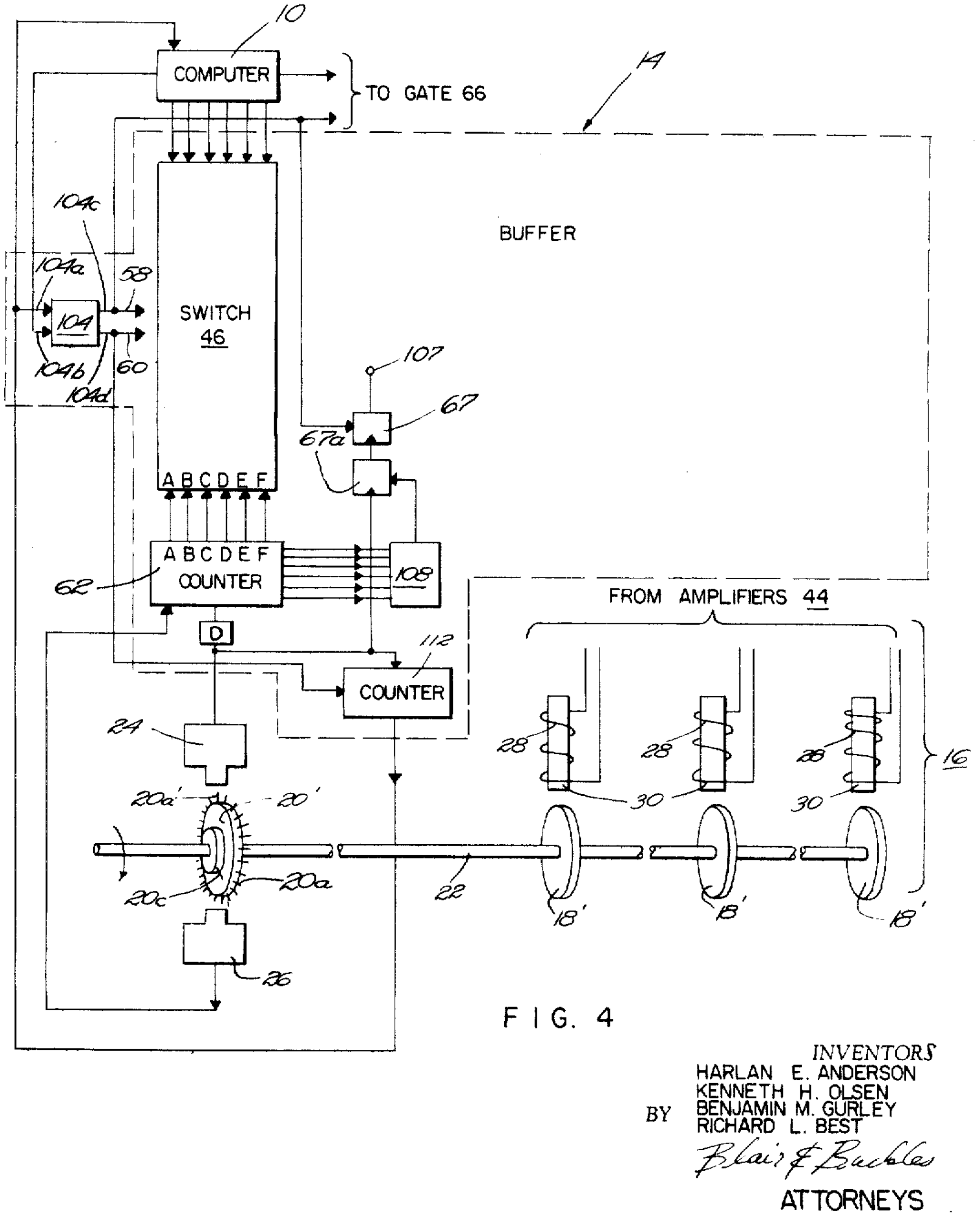
FIG. 4 is a schematic representation, in block form, of the buffer of FIG. 1 equipped with an additional counter for more flexible print operation.

Referring now to FIG. 4, according to an alternative system for printing the information stored in the buffer 14, the characters on print wheels 18' and the probes 20*a* on a timing wheel 20' may be uniformly spaced around the wheels, without the gap 20*b* of FIG. 1. As described below, the system described above is modified to permit the computer 10 to load information into the buffer regardless of the position of the timing wheel 20'.

More specifically, after the buffer is loaded, the computer energizes the input 104*b* of the flip-flop 104 to initiate printing. The system then commences printing with the next print wheel character approaching the print position and continues printing until the shaft 22 has completed a full revolution, as determined by means of a counter 112.

The counter 112 is connected to count the pulses developed as each probe 20*a* passes the sensor 24. However, the flip-flop output terminal 104*d* is connected to this counter to inhibit counting until the computer 10 signals the flip-flop 104 to commence printing. Thus, the counter 112 starts counting when the print cycle begins. After it has counted a number of pulses equal to the number of probes 20*a'* on the circumference of the print wheel 20', indicating that the print wheel has completed a full revolution, and, similarly, that all the information in the buffer has been printed, the counter 112 delivers an End-of-Print signal to the flip-flop input terminal 104*a*, switching the flip-flop to the load state. The End-of-Print signal is delivered also to the computer 10, signalling that the buffer is ready to accept the next word to be printed. The same signal is used internally by the counter 112 to clear itself.

The counter 62 again operates in the manner described above to encode the position of the shaft 22 and the print wheels rotating therewith and feed this information to the switch 46 for comparison with the contents of the buffer 14.

Thus, with the system of FIG. 4, the computer loads the buffer 14 regardless of the position of the timing wheel 20', and initiates the print cycle as soon as the buffer is loaded. Since the buffer of FIG. 4 can thus start loading and printing information independently of the position of the timing wheel, this embodiment of our invention makes possible still further savings in the operating time of the data processing system.

Figure 5:
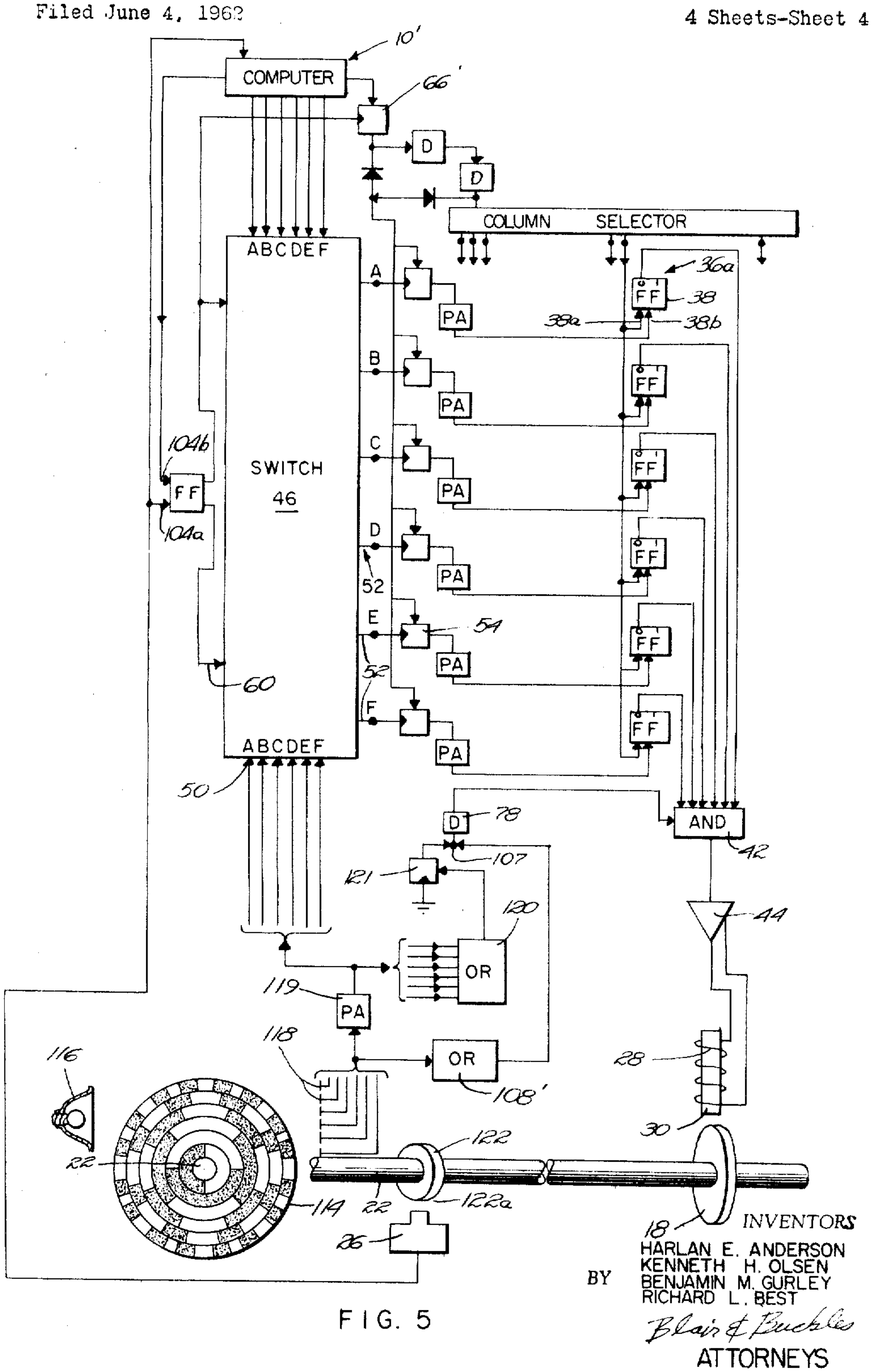
FIG. 5 is a schematic representation, in block form, of a line printer buffer incorporating different read-out logic from the buffer of FIG. 1.

In another embodiment of our invention illustrated in FIG. 5, the printer 16 is provided with a shaft position encoder 114 instead of the timing wheels 20 and 20'. The encoder 114 is keyed to rotate on the shaft 22 intermediate a plurality of optical transducers 118—118 and a lamp 116 that illuminates the transducers through the encoder.

The encoder 114 may be constructed according to well-known techniques in the form of a disk with rings having opaque and transparent segments alternating according to a selected code, so that, as the shaft 22 rotates, the shadow pattern the disk casts on the transducers 118 changes according to the code. Thus, the transducers 118—118, of which there is one for each digit in the code, may be photoelectric cells developing a set of binary signals identifying the position of the shaft.

The signals from the transducers 118—118 are delivered in parallel to a pulse amplifier 119 and they are also delivered to an OR circuit 108'. The OR circuit 108' serves the same blank space inhibiting function as the circuit 108 of FIG. 1. To this end, it is connected to a junction 107' at the input of the delay element 78 so as to inhibit, at the proper time, the transmission of hammer pulses to the delay element.

The pulse amplifier 119, which has a separate amplifier channel coupling each transducer 118 to the input terminal 50 associated therewith, responds only to changes in the voltage levels, i.e., pulses, from the respective transducer. In the absence of a change in the signal from a transducer 118, the amplifier 119 applies a negative level to the corresponding terminal 50. Whenever a transducer 118 emits a pulse, regardless of the polarity of the pulse, the amplifier 119 momentarily clamps the corresponding terminal 50 to ground. These pulses are also fed to an OR circuit 120 whose output signal is applied to the base input of a gate 121. The output terminal of the gate 121 is connected to the junction 107'.

The disk 114 has a gap (not shown), in which all the rings are transparent (or opaque). The binary output from the transducers 118 in this interval is thus 111111. The buffer 14 of FIG. 5 is loaded by the computer 10 during the time in which the gap passes the transducers. The loading operation is initiated by the sensor 26, which operates as in FIG. 1 to shift the switch 46 and transmit a pulse to the computer. The sensor senses a probe 122*a* on a wheel 122 affixed to the shaft 22. The probe passing the sensor 26 as the gap on the disk 114 begins to pass the transducers 118, as described above, when the computer 10 has finished loading the buffer 14, reshifts the switch 46 to permit printing.

During the printing cycle, when flip-flop 104 biases switch 46 to connect the terminals 50 to the terminals 52, it applies the negative voltage level to the gate 66', and this level is thus passed along the bus 64 to the gates 54. Accordingly, these gates are held open to connect the amplifiers 56 to the switch 46 during the entire printing cycle.

Still referring to FIG. 5, consider, for example, that the decimal number six, represented in binary Gray code by 000101, is stored in the buffer 14 in the column designated 36*a*. Also assume that the shaft encoder 114 develops a Gray coded representation of the position of the shaft 22. When the shaft 22 approaches the 0 positon, i.e., the position at which the print wheels can print a zero, the transducers 118—118 change to the corresponding binary Gray notation 000000, from the previous 111111 output registered as the gap in the disk 114 passed by.

When the shaft advances to the 1 position, the transducer output signal changes to 000001. Since only the last, least significant, digit in the transducer signal has changed, the pulse amplifier 119 applies a positive-going pulse to the switch input terminal 50F. Accordingly, the bottom row 35 of flip-flops 38, corresponding to the least significant digit, is complemented, changing the word stored in column 36*a* from 000101 to 00100.

It should be noted that in the Gray code only one digit changes each time the shaft 22 and printing wheels 18 thereon advance one position. Thus, a single transducer 118 emits a pulse for each successive position, and the row 35 of flip-flops corresponding to this transducer is complemented.

More specifically, when the encoder rotates to the 2 position, the transducers 118 develop the Gray code notation 000011 and the flip-flop row 35 second from the bottom is complemented by way of switch terminal 50E; thereafter, the column 36*a* registers 000110. When the encoder 114 is in position 3, the transducers develop the Gray notation 000010 and the flip-flops in the bottom row 35 are complemented via switch terminal 50F to register in column 36*a* the word 000111. The transducers develop the notation 000110 for the shaft position 4 and, after the complement pulse, the column 36*a* stores the word 000011. The transducer signal is 000111 when the shaft 22 advances to position 5, and the flip-flops in the second row from the bottom, corresponding to the binary digit that changed, are complemented, changing the word in column 36*a* to 000010.

After the shaft position 6 is attained, the change of the transducer signal from 000111 to 000101 causes the word in the flip-flops of column 36*a* to change to 000000. At this juncture, the AND circuit 42 connected to column 36*a* actuates its hammer solenoid 28 in response to a pulse from the delay element 78, thereby printing the character in the sixth position.

In the same manner, the characters stored in the other columns or registers 36 are printed, the number in each such register changing to 000000 as the shaft 22 rotates into the position corresponding to the number originally loaded into the register.

The above operation can be used when the buffer stores information and the shaft encoder is constructed to develop information coded according to the conventional binary code instead of the binary Gray code. However, the Gray code has the advantage that only one digit changes between successive numbers. Thus, the equipment performs a minimum number of switching operations, and the possibility of error due to a malfunction is minimized.

With further reference to FIG. 5, the print pulses are supplied to the delay element 78 by the OR circuit 120. The circuit 120 develops an output pulse for each pulse amplified by the amplifier 119, except when the junction 107' is held at ground level by the OR circuit 108' to inhibit hammer operation in the blank space position of the printing wheels. Thus, the OR circuit 120 transmits a pulse to the delay element 78 for each change in the character position of the printing wheels 18 registered by the transducers 118. No such pulses are developed during the interval in which the gap in the disk 114 passes the transducers 118, and, therefore, there is no interference with the loading of the buffer 14 by the computer 10 in this interval.

In this connection, it should be noted that the components used to inhibit hammer action in blank spaces may be eliminated by suitable coding of the blank space "character." In particular, if the code for the blank space corresponds to the gap in the disk 114 (or the gap 20*b* in the wheel 20 of FIG. 1), there will be no corresponding delivery of print pulses to the circuits 42 and hammer solenoids 28. In FIG. 5 this results from the absence of pulses from the amplifier 119 and in FIG. 1 it is due to the absence of probes 20*a* in the gap.

Further modifications of our system will be apparent from the foregoing description. For example, the timing wheel 20 and counter 62 of FIG. 1, which in essence operate as a position encoder for the printing wheels 18, may be replaced by a conventional shaft position encoder of the type shown in FIG. 5. The output of the encoder would run directly to the switch 46 as in FIG. 1, and a series of pulses, developed as in FIG. 5, would be applied to the junction 107 of FIG. 1.

Another variation of our invention involves forming each column 36 of flip-flops (FIG. 1) as a down counter. The information is loaded into the buffer in the manner described above. Then, during the printing sequence, the count pulses from the sensor 24 are fed directly to these down counters. Whenever a counter reaches a zero count, the next print pulse causes printing of the character associated with the number originally fed into the counter.

In summary, our improved line printer buffer comprises an ordered array of complementable binary elements schematically arranged in rows and columns. The elements are interconnected with a column-selecting switch and coincidence circuits in the manner described above, whereby digital information is rapidly stored in the memory elements by successively complementing the rows corresponding to a selected digit, clearing one column thereof and then complementing the same rows again. In a similar manner, the information stored in the memory elements may be read out to provide a signal from the coincidence circuits by successively complementing certain rows of the memory element, gating the coincidence circuits and then complementing the same rows again. The buffer also includes a switch that feeds digital information from a computer or the like to the memory elements during the load cycle, and delivers digital count signals to the memory elements.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. A printer buffer for receiving binary coded characters and transferring them to a printer that has print characters transported past a print position, said buffer comprising, in combination, (a) bistable memory elements schematically ordered in rows and in columns, (b) coincidence detecting circuits connected to said elements in each column thereof and capable of providing an output signal only when the states of said elements in a column represent a predetermined succession of binary digits, (c) load means connected to store characters in said columns by successively complementing said elements in said rows thereof according to the series of digits to be stored in a selected column, conditioning each element in said selected column to be in a selected state, and complementing the same rows that were previously complemented, (d) readout means operative alternately with respect to said load means, (e) sensing means delivering to said readout means a pulse for each print character that passes said print position, said readout means being connected to condition all elements in each column thereof to register said succession of digits whenever the character stored in the column by said load means corresponds to a selected print character.

2. The combination defined in claim 1 including means for utilizing said output signals from said coincidence detecting circuits to actuate said printer.

3. The combination defined in claim 1 in which (a) said sensing means delivers to said readout means a binary coded representation of the position of said print characters, and (b) in which said readout means successively complements said elements in said rows thereof according to the series of digits developed by said sensing means, actuates said coincidence circuits and complements the same rows that said readout means complemented previously.

4. A buffer for receiving binary coded information and transferring it to a printer having print characters, said buffer comprising, in combination, (a) bistable memory elements schematically ordered in rows and in columns, (b) pulse means connected to said elements, (c) first timing means connected to store information in said buffer by causing said pulse means to successively complement said elements in each row thereof in which a selected binary digit is to be stored, condition said elements in one column thereof to be in the same selected state, and complement said elements in the same rows that were complemented previously, (d) coding means coupled to said printer to deliver to said pulse means binary coded representations of successive print characters in position for printing, (e) coincidence circuits connected to sense selected states of said elements in said columns, (f) second timing means operable alternatively to said first timing means and connected to said pulse means and said coincidence circuits to transfer to said printer the information stored in said buffer by causing said pulse means to successively complement said elements in selected rows thereof according to the binary coded representation delivered by said coding means, energize said coincidence circuits and complement said elements in the same rows that were complemented prior to gating said coincidence circuits, (g) said coincidence circuits being connected to actuate said printer when said elements in a column have said selected state when said coincidence circuits are energized.

5. The combination defined in claim 4 in which (a) said pulse means is adapted to repeat the combination of complement and clear operations for each column of memory elements, thereby to load said buffer, (b) said second timing means actuates said pulse means after said buffer is loaded, and (c) said coding means and second timing means are adapted to repeat the combination of complement and gating operatings for each character passing the printing position in said printer.

6. The combination defined in claim 4 including means coupled to said coding means and adapted to prevent said coincidence means from actuating said printer whenever a column is in a second selected state, thereby to form a blank space.

7. The combination defined in claim 4 including (a) a counter connected to count the characters entering said printing position during the time said second timing means is operated, (b) said counter being connected to render said second timing means inoperative when said buffer has transferred to said printer all the information that might have been stored therein.

8. A printer buffer for receiving from a source binary coded characters and transferring them to a line printer that has print characters on moving carriages, said buffer comprising, in combination, (a) bistable memory elements schematically ordered in rows and in columns, (b) a column selector connected to clear all said elements in a column thereof, (c) coincidence detecting circuits connected to sense a selected combined state of said elements in each column, (d) a plurality of complementing means connected to complement said elements in said rows thereof, (e) a switch connected to receive said binary coded characters and transfer them to said complementing means, (f) first timing means connected to couple a pulse from said source to successively actuate said complementing means to which a selected binary digit is transferred, actuate said column selector to clear a selected one of said columns, and actuate the same complementing means again, (g) a position encoder adapted to sense the position of said carriages and deliver to said switch binary coded representations of said print characters, (h) said switch being connected to transfer said binary coded representations from said encoder to said complementing means, (i) second timing means arranged to deliver a pulse for each character passing the printing position to successively actuate said complementing means to which a selected binary digit is delivered from said encoder, gate said coincidence circuits to actuate said printer when the elements in a column thereof are in said selected combined state, and actuate the same complementing means again.

9. The combination defined in claim 8 including third timing means arranged to bias said switch to couple to said complementing means the binary coded signals from said source to the exclusion of the binary coded signals from said encoder, and alternatively to bias said switch to couple to said complementing means the binary coded signals from said encoder to the exclusion of the signals from said source.

10. The combination defined in claim 8 in which said first and second timing circuits operate alternately.

11. The combination defined in claim 8 including means adapted to alternately couple said first and second timing means to said complementing means.

12. A printer buffer for storing binary coded information and delivering it to a line printer that has a plurality of groups of print characters transported to a printing position, said buffer comprising, in combination, (a) a plurality of bistable memory elements schematically ordered in rows and in columns,
(b) a column selector connected to said elements to condition successive columns to a selected state when actuated,
(c) coincidence detecting circuits connected to the elements in each column thereof and capable of providing an output signal only when a column is in a selected printing state,
(d) a switch having a plurality of output terminals, first input terminals and second input terminals,
(e) said switch being arranged to couple said output terminals alternatively to said first and second terminals,
(f) complementing means connected between each of said switch output terminals and said elements in one row thereof,
(g) said complementing means being arranged when gated to complement the elements connected thereto when a selected binary digit is developed at the switch output terminal connected thereto,
(h) first timing means adapted to actuate said switch to connect said first input terminals to said output terminals and to successively gate said complement means, actuate said column selector and again gate said complement means,
(i) first counting means adapted to develop a pulse for each character passing said printing position and to deliver to said second input terminals of said switch binary coded representations of successive print characters passing said position,
(j) second timing means operable alternately with said first timing means and adapted to couple said second input terminals of said switch to said output terminals thereof and to successively gate said complementing means, gate said coincidence circuits and again gate said complementing means, and,
(k) means for utilizing said signals from said coincidence circuits to initiate printing of said characters.

13. The combination defined in claim 12 in which
(a) said complementing means include a plurality of gates, each of which has an output terminal, an input terminal and a bias terminal,
(b) each of said gates being connected between a switch output terminal and said elements in a row thereof with said output terminals being connected to said elements,
(c) said bias terminals being connected to said switch output terminals, and
(d) said input terminals being connected to said first timing means.

14. The combination defined in claim 12 including
(a) second counting means connected to count the characters passing said printing position during the interval when said second switch input terminals are coupled with said switch output terminals,
(b) said second counting means delivering an output signal to connect said first switch input terminals to said output terminals when said buffer has transferred to said printer all the information stored therein.

15. A line printer buffer for connection between a source of digital information and a line printer that has characters embossed on the circumference of a plurality of print wheels that rotate together and a printing mechanism for each wheel, said printing mechanisms being adapted to engage paper against the associated print wheels, and buffer comprising, in combination,
(a) a plurality of flip-flops schematically ordered in rows and in columns,
(b) each flip-flop having a complement input terminal, a ZERO input terminal and a ZERO output terminal,
(c) a column selector having output terminals, each of which is connected to the ZERO input terminals of all the flip-flops in one column thereof,
(d) AND circuits having a plurality of input terminals and connected to develop output signals when the signals developed at said input terminals thereof are the same,
(e) each of said AND circuits having its input terminals connected to said ZERO output terminals of the flip-flops in one column thereof,
(f) each of said AND circuits having an output terminal coupled to one of said printing mechanisms,
(g) a plurality of gates each of which has an input terminal, a bias terminal and an output terminal,
(h) each of said gate output terminals being connected to all the complement input terminals in a row of said flip-flops,
(i) counting means adapted to develop a pulse each time a print character passes said print position and to develop binary coded representations of the successive characters passing said printing mechanisms,
(j) a first switch having first input terminals to which said source delivers digital information, a second input terminal to which said counting means delivers said binary coded representations, and a plurality of output terminals, each of which is connected to said bias terminal of one of said gates,
(k) a first delay network connected to receive pulses from said information source and deliver them successively to said gate input terminals, to said AND circuits, and again to said gate input terminals,
(l) and a second switch controlled by said source and adapted to operate said first switch to couple said first input terminals to said output terminals and simultaneously to isolate said second delay network from said counting means, and alternately to operate said first switch to couple said second input terminals to said output terminals and to isolate said first delay network from said source.

16. The combination defined in claim 12 including a circuit coupled to said counting means and arranged to isolate said second delay network from said counting means to prevent said AND circuits from actuating said printer when a selected character is developed by said counting means.

17. A buffer for receiving binary coded information and transferring it to a printer having print characters, said buffer comprising, in combination,
(a) bistable memory elements schematically ordered in rows and columns,
(b) pulse means connected to said elements,
(c) first timing means connected to cause said pulse means to undergo a loading sequence comprising
 (1) successively complementing said elements in each row thereof in which a selected binary digit is to be stored,
 (2) conditioning said elements in one column thereof to be in the same selected state, and
 (3) complementing said elements in the same rows that were previously complemented,
(d) coding means coupled to said printer and developing binary coded representations of successive print characters in position for printing,
(e) coincidence circuits connected to said elements in each column thereof, each of said coincidence circuits being capable, when energized, of providing an output signal when the states of said elements in the column connected thereto correspond to a selected sequence of states,
(f) second timing means operable alternatively with said first timing means and connected to said pulse means and said coincidence circuits to cause said pulse means to successively complement said elements in selected rows thereof according to changes in the binary coded representation delivered by said coding means, and
(g) means employing said output signals from said coincidence circuits to actuate said printer.

18. A printer buffer for storing binary coded information and delivering it to a line printer that has a plurality of groups of print characters transported to a printing position, said buffer comprising, in combination, (a) a plurality of bistable memory elements schematically ordered in rows and in columns, (b) a column selector connected to said elements to condition successive columns to a selected state when actuated, (c) coincidence detecting circuits connected to the elements in each column thereof and capable, when energized, of providing output signals only when said elements in the columns connected thereto are in selected states, (d) a switch having a plurality of output terminals, first input terminals and second input terminals, (e) said switch being arranged to couple said output terminals alternatively to said first and second terminals, (f) a source of input information connected to said first input terminals, (g) complement means connected between each of said switch output terminals and said elements in one row thereof, (h) said complement means being arranged to complement the elements connected thereto when a selected binary digit is developed at the switch output terminal connected thereto, (i) first timing means connected to successively gate said complement means, actuate said column selector and again gate said complement means, (j) an encoder for developing a binary coded representation of successive print characters passing said printing position and delivering changes in said binary coded representation to said second input terminals of said switch, (k) second timing means operable alternately with said first timing means to energize said coincidence circuits during each passage of a character through said printing position, and (l) means for utilizing said signals from said coincidence circuits to initiate printing of said characters.

19. A line printer buffer comprising in combination (a) bistable memory elements schematically ordered in rows and in columns, (b) first means for accepting binary coded information corresponding to characters that are to be printed on a line printer, (c) second means (1) coupled to said first means and connected to said memory elements, (2) said second means being operative to successively (i) complement said elements in said rows thereof according to the series of digits to be stored in a selected column of memory elements, (ii) condition said elements in said selected column to be in the same selected state, and (iii) complement the same rows that were previously complemented, (d) coincidence detecting means (1) connected to said elements in each column thereof and (2) normally developing an output signal in response to the correspondence of the states of said elements in a column with a selected combination of states, (e) third means (1) sensing the character condition of said line printer, and (2) energizing said second means (i) each time the character condition of said printer changes (ii) to complement said elements in rows selected according to the character condition of said printer.

References Cited by the Examiner

UNITED STATES PATENTS

| | | | |
|---|---|---|---|
| 2,850,566 | 9/1958 | Nelson | 101—93 |
| 2,941,188 | 6/1960 | Flechtner et al. | 101—93 |
| 2,946,985 | 6/1960 | McMillan et al. | 101—93 |
| 3,088,401 | 5/1963 | Shimabukuro | 101—93 |

ROBERT C. BAILEY, *Primary Examiner.*

MALCOLM A. MORRISON, *Examiner.*